US012472656B2

(12) United States Patent
Marx et al.

(10) Patent No.: US 12,472,656 B2
(45) Date of Patent: Nov. 18, 2025

(54) SLICING MACHINE WITH SUCTION UNIT

(71) Applicant: MULTIVAC SEPP HAGGENMUELLER SE & CO. KG, Wolfertschwenden (DE)

(72) Inventors: Dominik Marx, Giessen (DE); Tom Stachel, Kempten (DE)

(73) Assignee: Multivac Sepp Haggenmueller Se & Co. KG, Wolfertschwenden (DE)

(*) Notice: Subject to any disclaimer, the term of this patent is extended or adjusted under 35 U.S.C. 154(b) by 422 days.

(21) Appl. No.: 18/131,237

(22) Filed: Apr. 5, 2023

(65) Prior Publication Data

US 2023/0321860 A1 Oct. 12, 2023

(30) Foreign Application Priority Data

Apr. 8, 2022 (DE) ........................ 102022108507.4

(51) Int. Cl.
*B26D 7/34* (2006.01)
*B26D 7/32* (2006.01)

(52) U.S. Cl.
CPC ................ *B26D 7/34* (2013.01); *B26D 7/32* (2013.01); *B26D 2210/02* (2013.01)

(58) Field of Classification Search
CPC ......... B26D 7/34; B26D 7/32; B26D 2210/02
See application file for complete search history.

(56) References Cited

U.S. PATENT DOCUMENTS

| | | | |
|---|---|---|---|
| 3,420,209 A | 1/1969 | Hensgen | |
| 2011/0265431 A1 | 11/2011 | Ramabardran | |
| 2013/0104709 A1 | 5/2013 | Rother | |
| 2015/0040521 A1 | 2/2015 | Hübner et al. | |
| 2022/0134590 A1* | 5/2022 | Reichard | B26D 7/325 83/13 |
| 2023/0321861 A1* | 10/2023 | Marx | B26D 5/007 83/13 |
| 2024/0058981 A1* | 2/2024 | Stachel | B26D 7/34 |
| 2024/0075647 A1* | 3/2024 | Stachel | B26D 7/0625 |

FOREIGN PATENT DOCUMENTS

| | | | |
|---|---|---|---|
| DE | 10 2007 048 015 A1 | 4/2009 | |
| DE | 10 2011 117 315 A1 | 5/2013 | |
| DE | 10 2013 216 497 A1 | 2/2015 | |
| EP | 3 539 739 A1 | 9/2019 | |

OTHER PUBLICATIONS

German Office Action dated Jul. 25, 2024, Application No. 102022108507.4, Applicant MULTIVAC Sepp Haggenmüller SE & Co. KG (with English machine translation) (15 pages).
German Search Report (with English Machine Translation) Dated Jul. 11, 2023, Application No. 10 2022 108 507.4, Applicant MULTIVAC Sepp Haggenmüller SE& Co. KG, 17 Pages.

* cited by examiner

*Primary Examiner* — Omar Flores Sanchez
(74) *Attorney, Agent, or Firm* — Brooks Kushman P.C.

(57) ABSTRACT

In order to keep anticaking agent-related dead times of a slicing machine as low as possible, excess anticaking agent suspended in the air is sucked off by a suction unit so that as little as possible is deposited on parts of the machine which subsequently have to be cleaned frequently, and/or instead of a single reservoir, several different reservoirs are used, which are switchable in their connection to a spray opening to be supplied, whereby it is easy to switch from an empty to a full reservoir, while the change or refilling of the emptied reservoir can be carried out without dead time during a cutting operation.

20 Claims, 9 Drawing Sheets

SLICING MACHINE WITH SUCTION UNIT

CROSS-REFERENCE TO RELATED APPLICATIONS

This application claims priority to German Patent Application No. DE 102022108507.4 filed on Apr. 8, 2022, the disclosure of which is incorporated in its entirety by reference herein.

TECHNICAL FIELD

The invention relates to slicing machines, in particular so-called slicers, which are used in the food industry to slice strands of an only slightly compressible product such as sausage or cheese.

BACKGROUND

Since these strands can be produced with a cross section that retains its shape and dimensions well over its length, i.e., essentially constant, they are called product calibers.

In most cases, several product calibers arranged parallel to each other on individual tracks are cut simultaneously by cutting off one slice at a time from the same blade, which moves in a transverse direction to the longitudinal direction of the product calibers.

The product calibers are pushed forward by a feed conveyor of a feeding unit in the direction of the blade of the cutting unit, usually on an obliquely downwardly directed feed conveyor, and guided in each case through the product openings of a plate-shaped, so-called cutting frame, at the front end of which the part of the product caliber protruding beyond it is cut off as a slice by the blade directly in front of the cutting frame, in the case of slicers usually with a cycle time of at most 150 ms to 38 ms, i.e., a blade speed of 400 to 1600 rpm.

The slices generally fall onto a first discharge conveyor, the so-called portioning belt, as part of a discharge unit, by means of which the individual slices are also collected into shingled or stacked portions on the portioning belt and transported away for further processing.

In such portions, where the slices at least partially overlap, there is the problem that, depending on the material, the slices sometimes adhere to each other so strongly that the customer cannot separate them without additional measures.

In this case, either a so-called interleaver in the form of a sheet of paper or film is placed between the individual slices as a separating aid when the portion is prepared, or a liquid or powdered separating agent is applied to the contact surface, the main surface of the slice, preferably by spraying.

However, this causes problems such as contamination of the machine by anticaking agent deposited on machine parts away from the slice, and interruption of operation due to refilling or changing of the anticaking agent in its reservoir.

SUMMARY

It is therefore the object of the invention to provide a slicing machine, in particular a slicer, which is capable of countering the above-mentioned problem and at the same time exhibits high process efficiency, as well as a method for operating such a slicing machine.

A generic slicing machine such as a, usually multi-track, slicer for cutting calibers into slices and depositing them in sliced or stacked portions typically comprises

- a cutting unit with a preferably rotating blade, usually a sickle blade, whose cutting edge on the outer circumference increases in its distance from the center of rotation in the opposite direction to the direction of rotation
- a feed unit for feeding the at least one caliber to be sliced to the cutting unit
- a discharge unit for the slices or portions formed therefrom with at least one discharge conveyor,
- a spray unit with at least one spray opening, in particular one spray opening per track, for applying a liquid or powdery anticaking agent to one of the main surfaces of the slices, in particular their contact surface,
- a control for controlling moving parts of the slicing machine.

The main surfaces of a slice are the two surfaces of the slice, usually parallel to each other, which are substantially larger than the peripheral surface, in particular the cut surfaces of the slice. In the case of shingled portions, i.e., when the slices of the portion are spaced apart in a row but partially overlap in the direction of the row, two successive slices lie on top of each other only with one part each of their main surfaces, the contact surfaces. In a stacked portion, on the other hand, the contact surface is the entire main surface in each case.

The liquid or powdery anticaking agent is applied between the slices of a portion either before the next slice is placed on the upper main surface of the preceding slice and/or before the next slice is placed on the already completed partial portion on its forward and downward facing main surface, preferably only on the contact surface of the respective main surface.

The spray unit is usually located in the angular area between the obliquely over-hanging front surface of the cutting frame—which is usually a part of the feed unit—or the cutting plane in which the cutting edge of the blade moves, and the discharge unit, in particular its portioning belt.

The suction spray unit is preferably arranged and embodied in such a way that the at least one spray opening applies anticaking agent in the direction of one, in particular only one, main surface of an existing slice or a slice yet to be produced.

A slice still to be produced is the beginning of the caliber, i.e., its front face, which after the slice has been separated represents one of the two main faces of the slice.

Spray unit and spray nozzle are understood to mean any unit or nozzle by means of which an anticaking agent can be applied, irrespective of whether it is a nozzle in the classical sense with a narrowing orifice and irrespective of whether the anticaking agent is applied under pressure or not.

In practice, however, the anticaking agent must be moved against the slice at a considerable speed, since the time available for application is extremely short.

In such a pressurized application, the anticaking agent—liquid or powder—is often finely sputtered with the aid of compressed air or another pressurized transport medium with the aid of the spray nozzle, for which purpose, in addition to the anticaking agent itself, the pressurized transport medium—irrespective of the type of transport medium, hereinafter referred to only as compressed air—must also be supplied to the spray nozzle via a corresponding supply line.

The basic idea of the invention is to reduce as far as possible the downtimes of the slicing machine caused by the necessity of applying anticaking agent.

According to a first aspect, the deposition of anticaking agent on machine parts is to be reduced in order to minimize the cleaning effort and, in particular, to in-crease the time distance between cleaning operations.

According to a second aspect, downtimes caused by refilling the reservoirs with anticaking agent are to be reduced by quickly switching from an empty to a full reservoir instead of time-consuming refilling, and the empty reservoir is refilled during slicing operation or preferably exchanged for a full refill reservoir.

According to the first aspect, a generic slicing machine according to the invention may comprise a suction unit having at least one suction opening for sucking off airborne anticaking agent, preferably irrespective of whether it is solid particles suspended in the air or minute droplets in the form of an aerosol of a liquid anticaking agent.

While the spray unit for applying anticaking agent usually has separate spray openings per track in a multi-track slicing machine, this is not absolutely necessary for the suction opening; in particular, there can also be only a single suction opening on the machine, even in the case of several tracks.

Since the very fast rotating blade is located in the area below its axis of rotation, i.e., in the height area of the cutting goggles or the front face of the machine, it is not necessary to have a single suction opening on the machine. of the front end faces of the at least one calibrator located in the feeding unit, always moves in the same direction, the lower tangential direction, along the width of the machine, for example towards the left side of the machine as seen in the transport direction, in particular towards the operator's side, there is a permanent air flow in this lower tangential direction in this area during slicing operation, as a result of which the anticaking agent freely suspended in the air there is also transported in this lower tangential direction.

In a preferred first design, therefore, the suction opening, in particular the entire suction unit, is arranged on that side of the entire machine—or, in the case of individual discharge conveyors spaced apart in the transverse direction, in particular portioning belts, on that side of the respective belt—in which this lower tangential direction already transports the free-floating anticaking agent anyway.

With regard to the longitudinal direction of the machine, i.e., the transport direction of the products through the machine, the suction opening is primarily arranged in the longitudinal range of the cutting plane, i.e., the cutting frame. Preferably, the suction opening will extend in longitudinal direction across the cutting plane.

Preferably, the suction opening will extend in the height range at least over the entire height of the cutting frame, and in particular also extend downwards over the height of the support surface on the discharge conveyor, in particular the portioning belt.

This ensures that an optimally large proportion of the anticaking agent suspended freely in the cutting area reaches the suction opening, which is also subjected to negative pressure.

The opening plane of the suction opening will preferably extend parallel to the longitudinal centerline of the machine spanned by the longitudinal direction and the vertical and/or will preferably be located as close as possible to the side of the discharge conveyor and/or the feed unit and/or the cutting frame.

As a result, the opening plane is at right angles to the lower tangential direction in which the free-floating anticaking agent is moved in the direction of the suction opening anyway. Preferably, the opening plane is located as close as possible to the side of the discharge unit or the single discharge conveyor of the discharge unit or the cutting frame.

However, where the suction opening and in particular the entire suction unit is positioned in the machine can also be made dependent on the positioning and spray direction of the spray unit.

This applies in particular to an, in particular alternative, second design in which a single suction opening extends in the transverse direction over the width of essentially the entire discharge conveyor or cutting frame, or in which the multiple suction openings—in particular those assigned to the individual tracks—are arranged side by side at a distance in the transverse direction.

In the case of a multi-track machine, the spray openings assigned to the individual tracks are usually arranged at a distance from one another across the width of the machine, whereby the air flow generated by the rotation of the blade and flowing in the lower tangential direction must also usually be taken into account when determining the spray direction.

The spray unit on the one hand and the suction unit on the other, in particular its spray opening on the one hand and the suction opening on the other, can be arranged on opposite sides of the underside of the caliber channel, i.e., of the movement channel of the caliber virtually extended beyond the cutting plane. The spray direction then usually runs counter to the transport direction of the products through the machine, since the suction spray unit is arranged on the slice side of the cutting plane and is directed towards the cutting plane, in particular towards the cutting frame.

For example, the spray unit can be arranged above this caliber channel or on the underside of this caliber channel, and its spray direction can be directed obliquely downward against the—preferably individual—product opening in the cutting frame, so that the anticaking agent is moved obliquely downward anyway. It is then advisable to arrange the suction unit, and in particular its suction opening, below the caliber channel, especially at the angle between the cutting plane and the product support surface of the discharge conveyor.

When positioning both the spray unit and the suction unit, care must of course always be taken to ensure that no component is in the path of the slice that is cut off and falls onto the discharge conveyor.

Even if the spray unit is not above but inside the caliber channel, but the spray direction still points obliquely downwards, such an arrangement of the suction unit makes sense.

Since the suction opening should generally be relatively large in order to facilitate suction, and in any case generally larger than a spray opening, the reverse procedure may also be advisable, namely to arrange the suction opening above the caliber channel and the suction/spray unit with at least one spray opening in the area of the caliber channel, or below it, in any case away from the fall path of the slices to be separated.

In this case, the spray direction is usually directed obliquely upwards anyway, so that the anticaking agent moving in the air moves upwards anyway, i.e., also towards the suction opening, which facilitates suction.

The relative arrangement of the spray opening on the one hand and the suction opening on the other relative to the cutting plane is also an important parameter.

If both are located on the same side of the cutting plane, namely on the caliber side, and preferably again on opposite sides with respect to the caliber channel, the opening located below the caliber channel is preferably located in the cutting frame or below the lower end of the cutting frame.

The opening above the caliber channel can also be arranged in the cutting frame or in the cutting head housing, in which the rotating blade is normally mounted and the blade drive is located, then preferably in the area of—viewed from the side—its lower, front area.

The disadvantage of the arrangement on the caliber side is basically that there is only very little space of fractions of a millimeter between the cutting frame and the cutting plane, and due to the design of the blade, the front surface of the cutting frame is covered by the blade for at least half of the cutting time, which also causes strong air turbulence due to its high speed.

This can make it difficult to apply anticaking agents to the front surface of the cutter and even more difficult to extract them from the caliber side.

This disadvantage can be partially compensated by arranging a suction opening—if necessary in addition to the positioning described above—on the side next to the at least one caliber channel, in particular on the side next to the cutting frame in which the lower direction of rotation of the blade points, for the reasons already described above. In a multi-track machine, such suction openings can also be located in the cutting frame between the product openings.

If, on the other hand, the spray opening and the suction opening are both located on the side of the slice with respect to of the cutting plane, one of the possibilities is to arrange the one or more suction openings in a suction bar running in the transverse direction, in particular across all tracks, which can be positioned very precisely with the aid of a holding device, which in turn must be made dependent on the position and spray direction of the spray openings, which can also be arranged in a spray bar.

Both bars can be combined in their functions as one function bar.

If the spray direction is primarily from top to bottom, namely towards the discharge conveyor unit, because the top side of the last slice to hit the discharge conveyor unit is to be wetted with anticaking agent, then the at least one spray opening is already located above the support surface of the discharge conveyor unit, i.e., the support plane defined by the support surface of the discharge conveyor unit, for example the top side of the first discharge belt of the portioning conveyor.

Preferably, the suction opening is then also arranged above this depositing plane, and in particular offset relative to one another in the transport direction, with openings facing one another, so that the suction opening is thus offset relative to the spray opening in or against the transport direction, the spray direction usually pointing against the transport direction.

As a result, the anticaking agent dust already moves in the direction of the suction opening due to its spray direction.

However, the spray opening and the suction opening can also be located on different sides with respect to the transport direction of the products, especially if the spray direction has at least one component in the transverse direction, because then the suction opening can be arranged offset in the transverse direction with respect to the spray opening, namely in the direction in which the transverse component of the spray direction points.

Preferably, the transverse component of the spray direction is identical to the lower tangential direction in which the air near the blade is moved in its lower half by the direction of rotation of the blade.

This is particularly useful when applying anticaking agent to each track individually with a transverse component in a multi-track slicing machine, as this enables efficient suction and prevents anticaking agent from being deposited on the conveyor belt between the slices or portions to a large extent.

The narrower the discharge conveyor, the more likely it is that one or more suction openings will be located laterally next to the discharge conveyor, preferably at about the level of the deposit plane, preferably just above or just below it.

Preferably, the suction opening then has an extension in the transport direction which corresponds at least to the length of a portion and/or the length of the first discharge conveyor, in particular the portioning belt, in the transport direction.

With regard to the second aspect, the slicing machine—in particular instead of a single reservoir for anticaking agent—may comprise several reservoirs, wherein two reservoirs may either contain the same contents, i.e., the same type of, for example, anticaking agent, or different types.

The individual reservoirs which supply the same spray opening or group of spray openings with anticaking agent are to be switchably connected to one another in the sense that one of two or more reservoirs can optionally be connected to the corresponding spray opening or group of spray openings via a valve.

In the case of reservoirs with the same contents, this makes it possible to switch over to the second, filled reservoir with the same contents when a first reservoir runs empty, and the slicing operation can continue for this reason with no or extremely short time delay, and the empty reservoir can be refilled or exchanged for a filled reservoir during the ongoing slicing operation.

In the case of reservoirs with different contents, which are required for different jobs, for example, it is possible to switch from one reservoir to the other when changing from one job to the next without having to accept additional dead time of the slicing machine.

As a rule, such reservoirs will be under positive pressure, with which the anticaking agent is transported from there to the spray opening and discharged from the spray opening.

In this case, the reservoirs are preferably interconnected in such a way that, at the same time as the switchover from the outlet opening of one reservoir to the outlet opening of the other reservoir is effected—usually automatically by the control system—for the purpose of connection to the same spray opening or group of spray openings, the pressurization on the pressure supply side is also switched over simultaneously or quasi-simultaneously from one reservoir to the other.

This is a prerequisite for the Reservoir which has run dry, for example, to be subsequently changed or—in a depressurized state—refilled.

This design also makes it possible to use relatively small reservoirs for anticaking agents, since the replacement or refilling no longer results in any appreciable dead times, which opens up the possibility of arranging the reservoirs close to the spray opening and thus keeping the length of the connecting lines within the spray unit short.

This allows a suction unit to be positioned relatively freely within the working space of the machine, regardless of available line lengths.

For example, the suction unit can comprise a suction bar along the longitudinal direction of which one or more suction openings are provided, and to which one or more reservoirs can also be attached.

Such a suction bar can be attached to a holding device and can be positioned and adjusted relative to the base frame of the machine by means of the holding device.

This makes it easy to adapt the suction unit, in particular by positioning the suction opening, to different work jobs.

Preferably, the suction beam is attached to the holding device only at one point along its longitudinal extension, in particular at one of its end sections, since such a one-sided cantilevered attachment allows good accessibility, especially from the other side, by the operator.

The holding device can also be beam-shaped, with its longitudinal direction also extending in particular in the transport direction and the longitudinal direction of the suction beam in the transverse direction.

For positioning the suction beam, it can be adjusted along the longitudinal direction of the beam-shaped holding device and, if necessary, also pivoted about its own longitudinal extension relative to the holding device.

A particularly variable adjustment of the suction bar is possible if the holding device is embodied in two parts with a main arm which can be fastened to the base frame and a pivoting arm which is fastened to the main arm and can be pivoted about a transverse axis relative to the main arm and which in turn carries the suction bar, for example at its free end section.

The adjustability of the suction beam is further improved if in addition one of the two arms, in particular the main arm, is adjustable in length, for example telescopic.

With regard to the method for operating the slicing machine, in particular a multi-track slicing machine, with a suction unit, in particular a slicing machine as described above, the existing object is solved in that during the slicing operation, i.e., even during the slicing of one and the same caliber, according to a first aspect, anticaking agent suspended in the air is automatically sucked off, in particular the anticaking agent not deposited on the main surface of a slice is automatically sucked off in a controlled manner.

For this purpose, the suction is preferably interrupted while anticaking agent is discharged in a short pressure surge in the direction of the slice to be coated, in order to allow deposition on the slice, or more precisely its main surface, and only then to suck off the anticaking agent still in the air.

In addition or instead, according to a second aspect, it is possible to automatically switch between several existing reservoirs for supplying the same spray opening or group of spray openings of the Spray unit, in order to either not have to interrupt the slicing operation or to interrupt it only very briefly when a Reservoir runs empty or when it is necessary to change from one type of anticaking agent to another, since the refilling or the change of a Reservoir can be carried out after-wards, during the ongoing slicing operation.

BRIEF DESCRIPTION OF THE DRAWINGS

Embodiments according to the invention are described in more detail below by way of example, and with reference to the drawings which show.

DETAILED DESCRIPTION

Figure 1A:
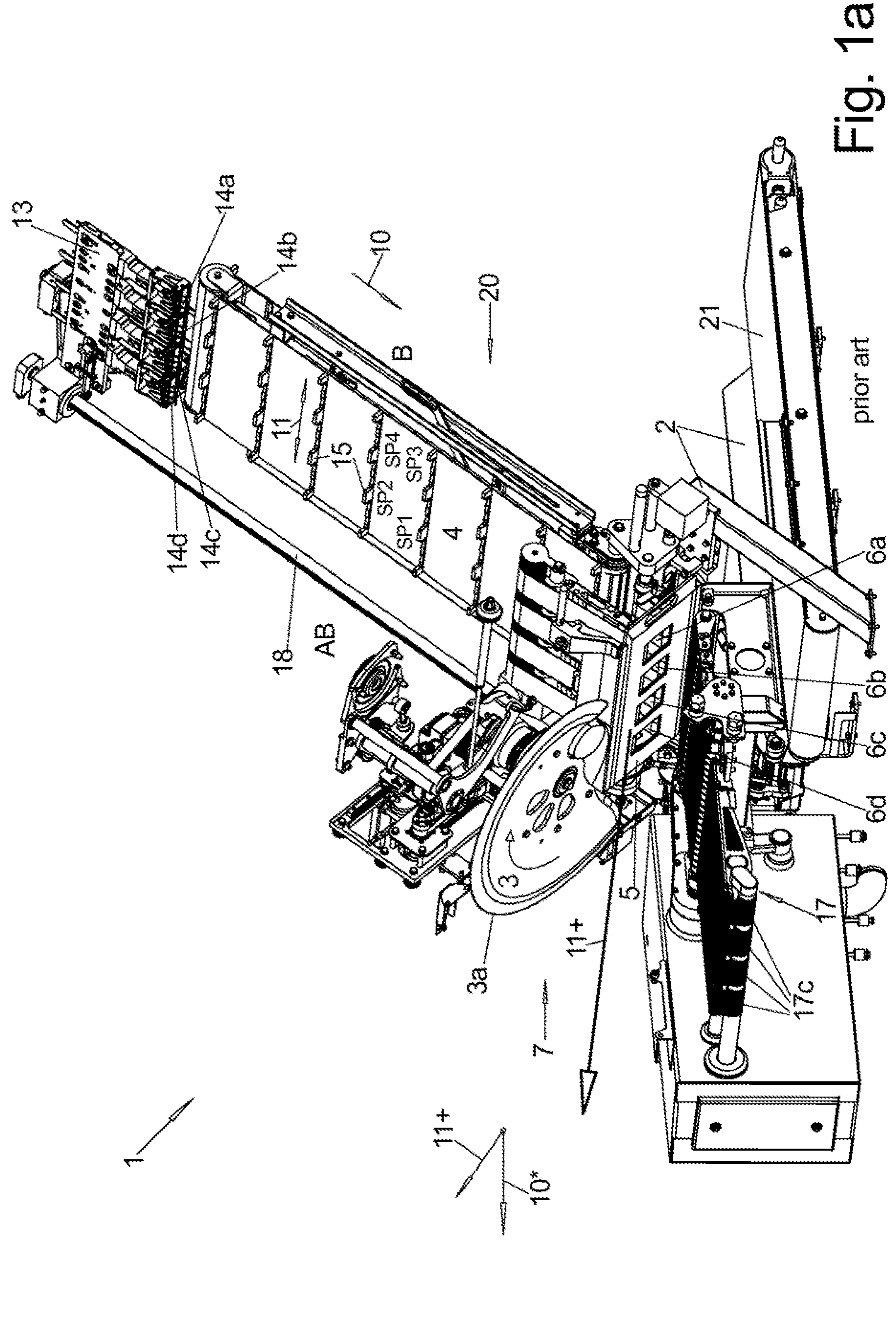
FIGS. 1*a, b*: a slicing machine in the form of a slicer according to the prior art in different perspective views, with the feed belt tilted up into the slicing position.
Figure 1B:
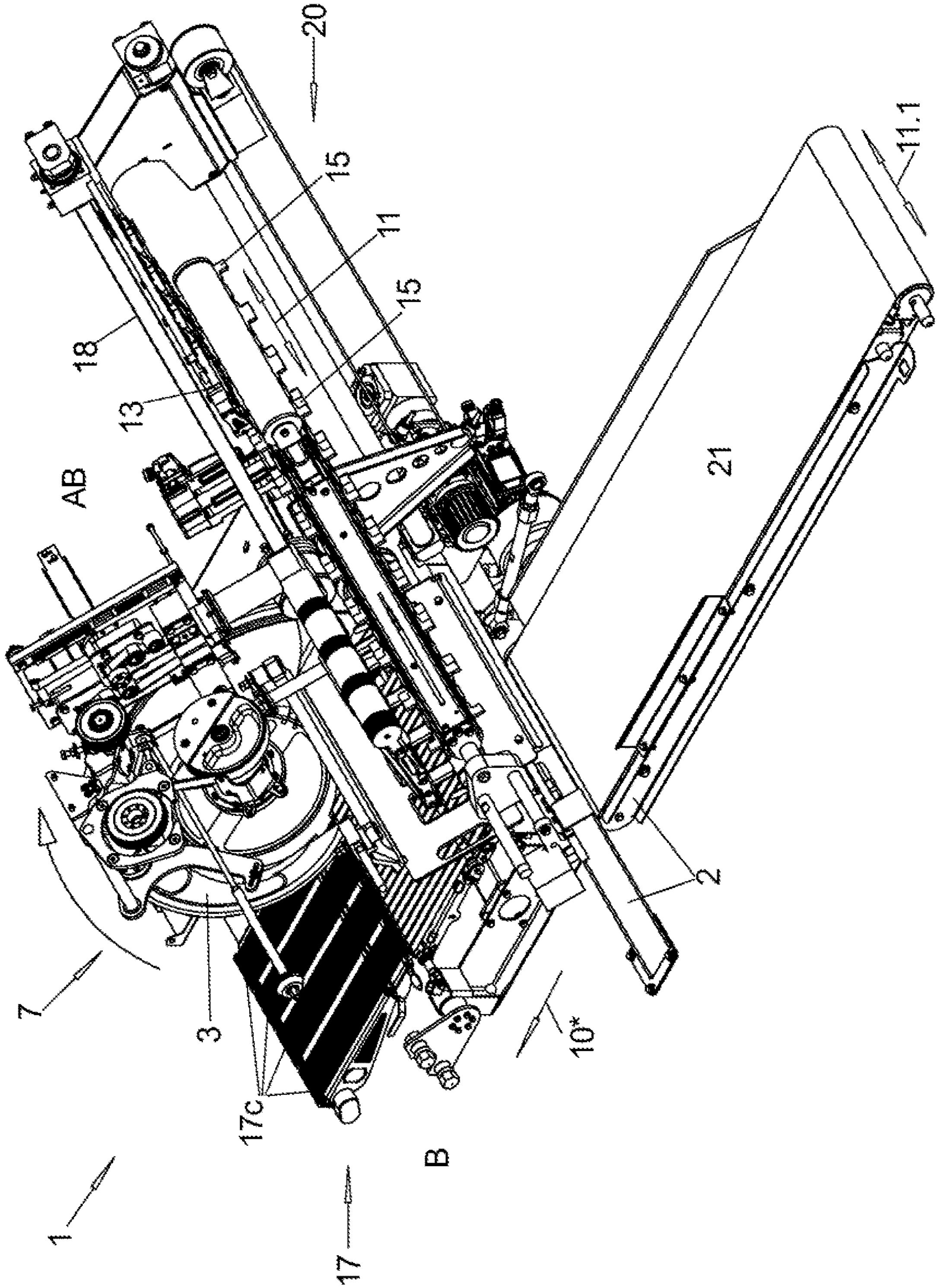
prior art Fig. 1b
FIG. 1*c*: the slicing machine of FIGS. 1*a, b* in side view with the cover parts removed so that the different conveyor belts can be seen more clearly.
FIG. 1*d*: a principle representation of a partial area of FIG. 1*c* according to the state of the art with a spray unit in the side view, FIGS. 2*a, b*: Principle representations according to FIG. 1*d* with suction de-vices according to the invention with different spray directions.

FIGS. 1*a*, 1*b* show different perspective views of a known multi-track slicer 1 for simultaneous slicing of several product calibers K on one track SP1 to SP4 next to each other and depositing in shingled portions P each consisting of several slices S with a general passage direction 10* through the slicer 1 from right to left.

Figure 1C:
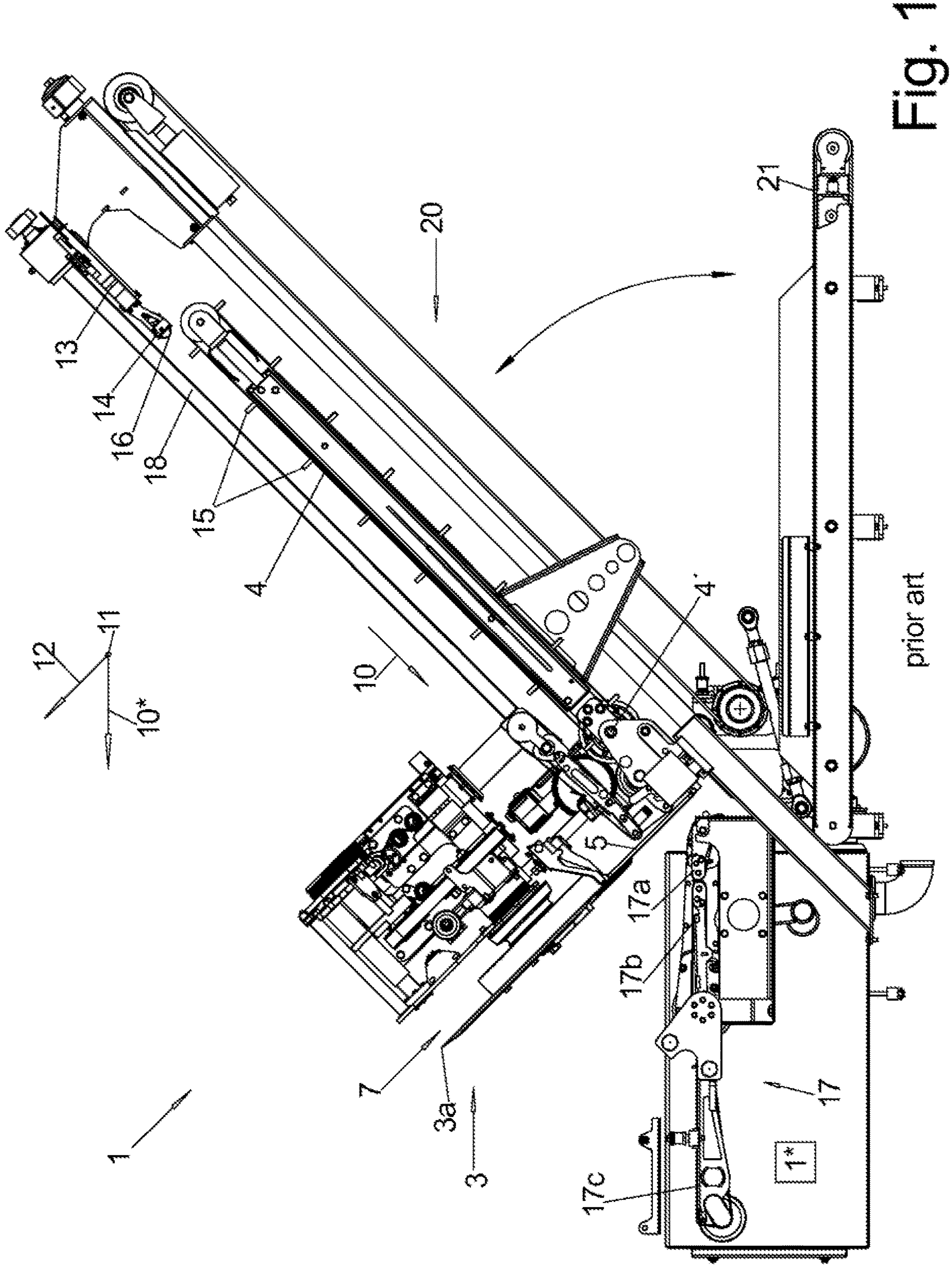

FIG. 1*c* shows—without the caliber K inserted—a side view of this slicer 1, omitting covers and other parts not relevant to the invention, which are attached to the base frame 2 like all other units, so that the functional parts, especially the conveyor belts, can be seen more clearly. The longitudinal direction 10 is the feeding direction of the calibers K to the cutting unit 7 and thus also the longitudinal direction of the calibers K lying in the slicer 1.

It can be seen that the basic structure of a slicer 1 according to the state of the art is that a cutting unit 7 with blades 3 rotating about a blade axis 3', in this case a sickle blade 3, is provided with several, in this case four, product calibers K lying side by side transversely to the feeding direction 10 on a feed conveyor 4 with spacers 15 of the feed conveyor 4 between them which are fed by this feed unit 20, from the front ends of which the rotating blade 3 cuts off a slice S with its cutting edge 3*a* in each case in a single operation, i.e., almost simultaneously.

Since the sickle blade 3—viewed from the front, i.e., in FIGS. 1*a, b, c* from the left and thus counter to the passage direction 10*—rotates clockwise, it moves in its lower half in one of the directions of the transverse axis 11, namely the lower tangential direction 11+, i.e., away from the operator side B viewed in FIG. 1*c* towards the opposite anti-operator side AB, and also generates a considerable air flow in this direction in the region below its rotational axis 3'.

For the cutting of the product calibers K, the feed conveyor 4 is in the cutting position shown in FIGS. 1*a*-1*d*, which is oblique in side view with a low-lying cutting-side front end and a high-lying rear end, from which it can be folded down into an approximately horizontal loading position about a pivot axis 4' running in its width direction, the first transverse direction 11, which is located in the vicinity of the cutting unit 7.

Figure 4A:
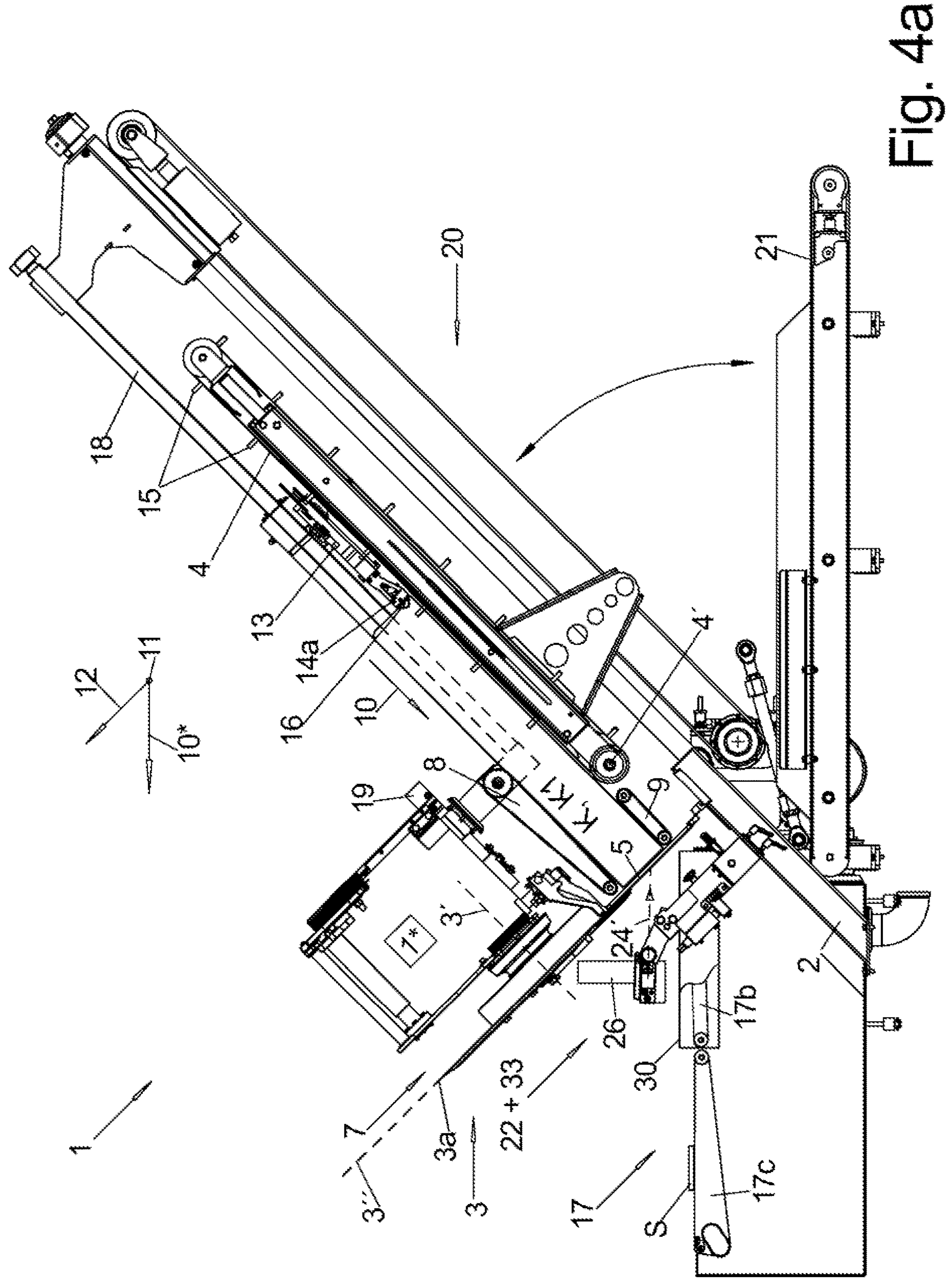
FIG. 4*a*: a representation analogous to FIG. 1*c* with an additional combined suction and spray unit.

The rear end of each caliber K lying in the feed unit 20 is—see FIG. 4*a*—positively held in each case by a gripper 14*a-d* with the aid of gripper claws 16. These grippers 14*a*-14*d*, which can be activated and deactivated with respect to the position of the gripper claws 16, are attached to a common gripper slide 13, which can be moved along a gripper guide 18 in the feeding direction 10.

Both the feed of the gripper slide 13 and of the feed conveyor 4 can be driven in a controlled manner, but the actual feed speed of the calibers K is effected by a so-called upper and lower product guide 8, 9, which are also driven in a controlled manner and engage on the upper side and lower side of the calibers K to be cut open in their front end sections near the cutting unit 7.

The front ends of the calibers K are guided in each case through a so-called product opening 6*a-d* of a plate-shaped cutting frame 5, wherein the cutting plane 3", in which the blade 3 rotates with its cutting edge 3*a* and thus cuts off the projection of the calibers K from the cutting frame 5 as a slice S, runs immediately in front of the front end face of the cutting frame 5 pointing obliquely downwards, as can be seen better in the enlarged principle representation of FIG.

1*d*. The cutting plane 3" runs perpendicular to the upper run of the feed conveyor 4 and/or is spanned by the two transverse directions 11, 12 to the feeding direction 10.

The inner circumference of the product openings 6*a-d* serves as a counter cutting edge of the cutting edge 3*a* of the blade 3.

Since both product guides 8, 9 can be driven in a controlled manner, in particular independently of one another and/or possibly separately for each track SP1 to SP4, they determine the—continuous or clocked—feed speed of the calibers K through the cutting frame 5.

The upper product guide 8 is displaceable in the 2. transverse direction 12—which is perpendicular to the surface of the upper run of the infeed conveyor 4—for adaptation to the height H of the caliber K in this direction. Furthermore, at least one of the product guides 8, 9 can be embodied to be pivotable about one of its deflecting rollers in order to be able to change the direction of the strand of its guide belt lying against the caliber K to a limited extent.

Below the feed conveyor unit 20 there is usually an approximately horizontally running residue conveyor 21, which starts with its front end below the cutting frame 5 and directly below or behind the discharge conveyor unit 17 and with its upper run thereon—by means of the drive of one of the discharge conveyors 17 against the passage direction 10—transports away falling residues to the rear.

The slices S standing at an angle in space during separation fall onto a discharge unit 17 starting below the cutting frame 5 and running in passage direction 10*, which in this case consists of several discharge conveyors 17*a, b, c* arranged one behind the other with their upper runs approximately in alignment in passage direction 10*, of which the first discharge conveyor 17*a* in passage direction 10* can be embodied as a portioning belt 17*a* and/or one can also be embodied as a weighing unit.

The slices S can hit the discharge conveyor 17 individually and spaced apart from each other in the passage direction 10* or form shingled or stacked portions P by appropriate control of the portioning belt 17*a* of the discharge unit 17—the movement of which, like almost all moving parts, is controlled by the control 1*—by stepwise forward movement of the portioning belt 17*a*.

Figure 1D:
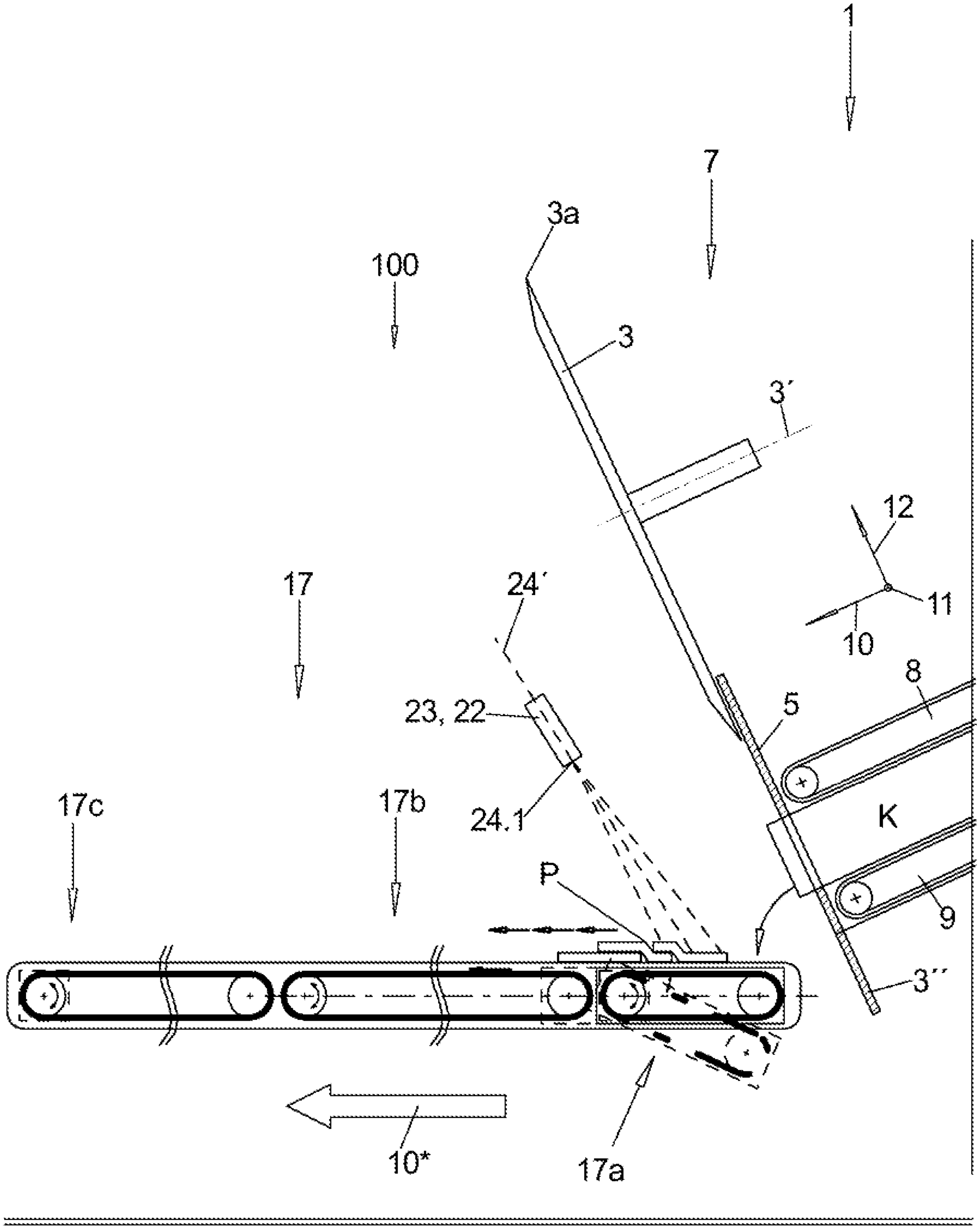

In the enlarged side view of FIG. 1*d*, a spray unit 22 for applying an anticaking agent T to the slices S is also shown.

Figure 3:
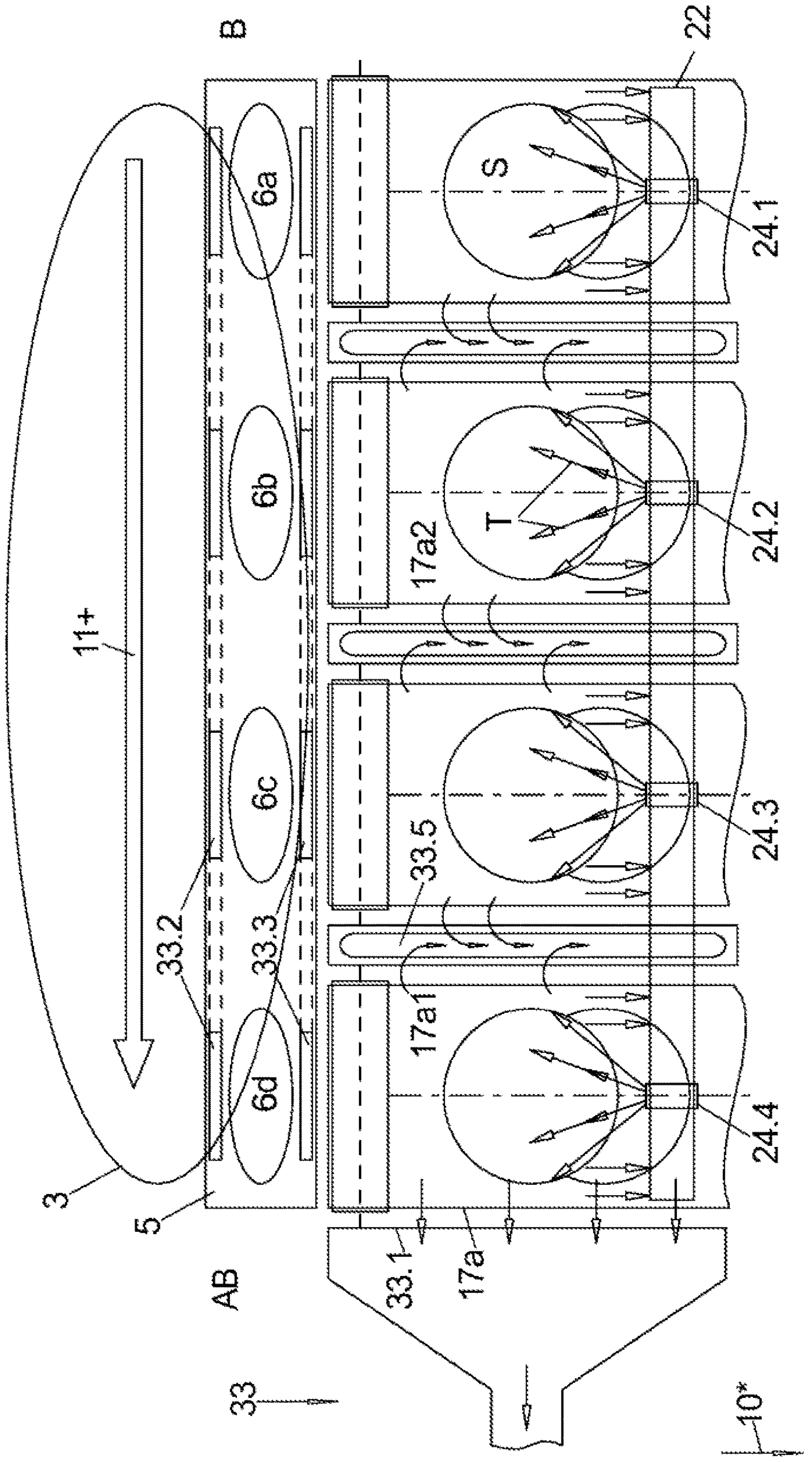
FIG. 3: the situation of FIG. 2*a* in top view.

In FIG. 1*d*, the spray bar 23 of the spray unit 22, which extends in the transverse direction 11, is in such a pivoted position about the transverse direction 11, which is also the longitudinal extension 23' of the spray bar 23, that the nozzle units mounted in the right-hand narrow side of the spray bar 23 in FIG. 1*d* move with the spray direction 24' of their spray nozzles 24. 1 ff points obliquely downwards to the rear and thus, for example, each spray nozzle 24.1-24.4 coats the upper side of one of the last slices S already deposited on the portioning belt 17*a* with the anticaking agent T when the spray nozzle 24 is activated, as shown in the top view of FIG. 3.

Figure 2A:
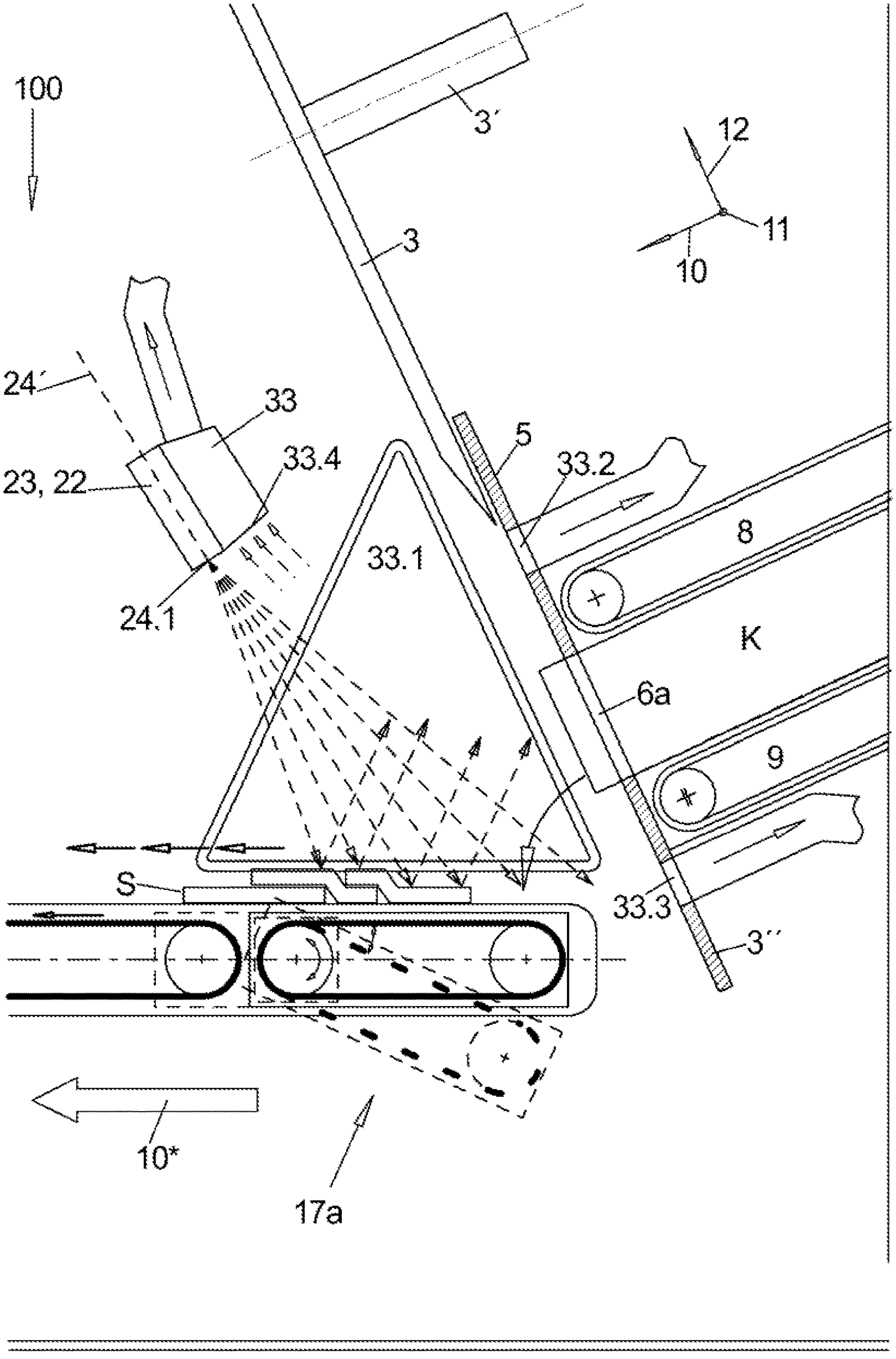

In order to prevent deposits of release agent T on parts of the machine, FIGS. 2*a, b* show a suction unit 33 with different suction openings 33.1-33.5 in side view for different spray directions 24' of the spray unit 22 for a release agent T to be applied, with different possibilities for arranging the at least one suction opening 33.1 of the suction unit 33 in the machine, FIG. 3 additionally showing the situation of FIG. 2*a* in plan view.

Since, according to FIG. 3, in the angular region between the cutting frame 5 and the discharge conveyor unit 17 there is in any case a strong air flow in the lower tangential direction 11+ from the operator side B to the anti-operator side AB, caused by the direction of rotation of the blade, which also transports anticaking agent suspended therein to that side, the suction opening 33.1 is arranged where the air flow is directed, in this case on the anti-operator side AB of the discharge conveyor 17 and primarily above the support surface of the discharge unit 17*a*.

Suction is facilitated by a large-area suction opening 33.1, which is why, as shown in FIG. 2*a*, it primarily covers the entire angular area between the cutting plane 3" and the upper run of the discharge conveyor of the discharge unit 17 and extends in the passage direction 10*, preferably with the underside of the upright triangular shape of the suction opening 33.1, over the entire length of the first discharge conveyor 17*a*, the portioning belt 17.

This lower extension is also useful in the case of other, non-triangular shapes of the suction opening 33.1 there, for example, if it were to extend merely in the form of a slit in the passage direction 10*, approximately just above the level of the upper run of the portioning belt 17*a*.

Figure 2B:
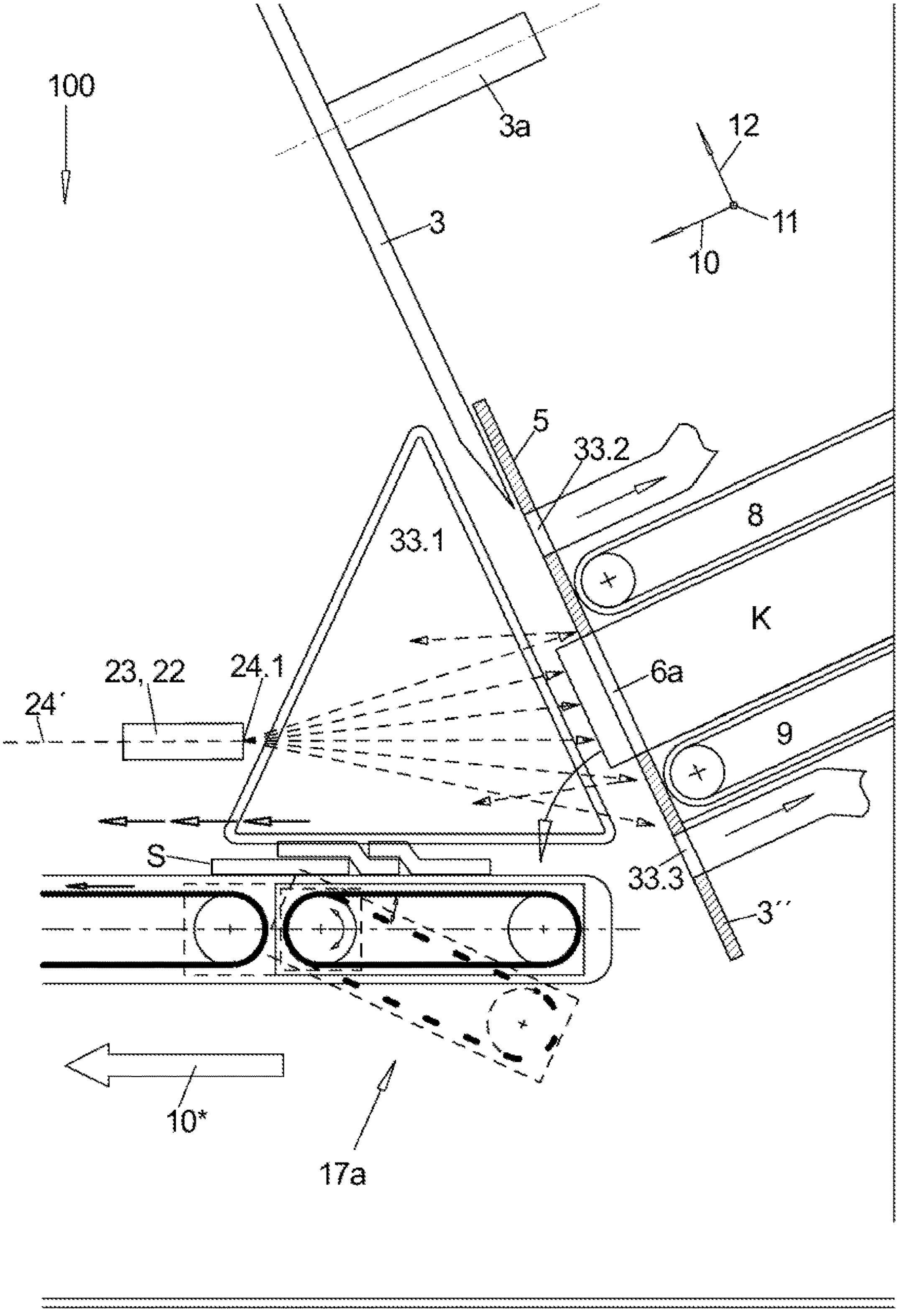

An extension of the suction opening 33.1 in height to above the upper edges of the product openings, e.g., 6*a* in the cutting frame 5, is particularly useful if the anticaking agent is not applied—as in FIG. 2*a*—to the last slice S already deposited on the portioning belt 17*a*, but is sprayed against the passage direction 10* in the direction of the front face of the caliber K, i.e., of the slice not yet cut off, as shown in FIG. 2*b*.

Just then, anticaking agent will also be in the air above and below this front face of the caliber K, will be transported away to the anti-operator side AB and can then be sucked off most completely with a suction opening 33.1, which extends in height from below to above the product opening 6*a*.

If the discharge unit 17, in particular the portioning belt 17*a*, consists of several separate portioning belts 17*a*1, 17*a*2 spaced apart next to each other in the transverse direction 11, it can be useful to arrange a suction opening 33.5 as shown in FIG. 3 between each of these individual portioning belts in the transverse direction 11, which preferably extends in the passage direction 10* over the entire length of the portioning belt, e.g., 17*a*1.

Such a suction opening 33.5 can be open at the top and be located approximately at the height of the upper run of the portioning belt 17*a*—set in the horizontal position—and is not shown in FIG. 2*a* for reasons of clarity.

However, such a suction opening can also be arranged in a suction element arranged between the individual portioning belts 17*a*1, 17*a*2 and projecting upwards—open towards the operator side B, preferably with a size and shape as described with reference to the suction opening 33.1.

FIGS. 2*a, b* show further possible positioning of suction openings 33.2, namely above the product openings 6*a* to 6*d*, embodied in the shape of a slot and running in the transverse direction 11, and/or below these product openings 6*a* to 6*d*, embodied in the same way and running in the transverse direction 11 as suction openings 33.3, whereby this can be several individual such suction openings in transverse direction 11 or a suction opening extending over all tracks SP1-SB4 and product openings 6*a* to 6*d*.

The arrangement can be made in the cutting frame 5 or above or below it in a separate component.

Furthermore, it should be made clear that a suction line, which can be pressurized with negative pressure, will be connected to each suction opening in order to transport the anticaking agent-loaded air to a collection unit—not shown—for suctioned-off anticaking agent, in particular with a filter unit, because in very few cases there will additionally be sufficient installation space in the component in which the suction opening is arranged to provide such a collection container with filter unit and also negative pressure generation.

Figure 4B:
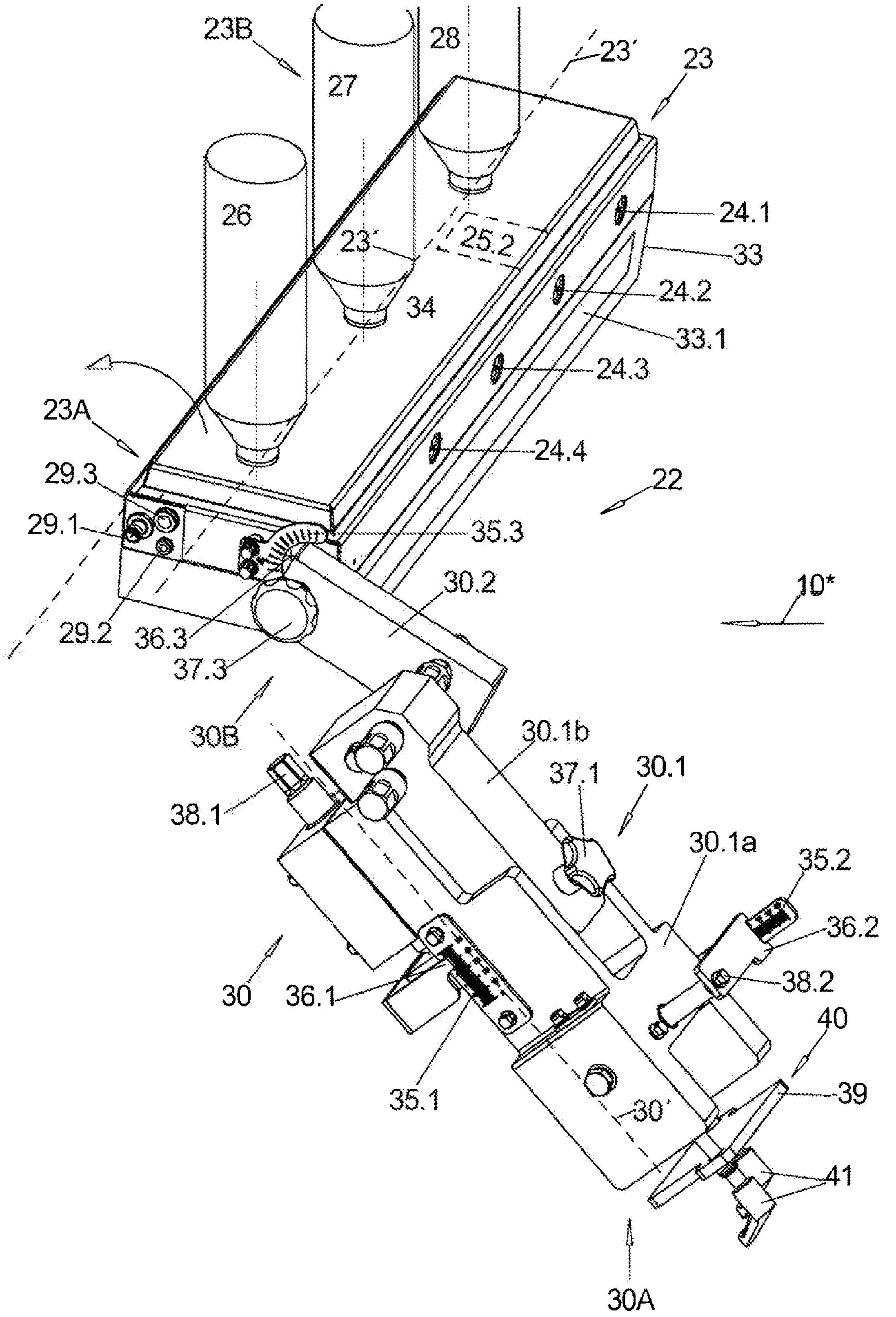
FIG. 4*b*: a perspective view of the suction/spray unit alone with the spray bar closed.

In the side view of FIG. 4*a*, the design of a combined suction/spray unit 22+33 with a function bar 23 running across the discharge conveyor 17, i.e., across all tracks SP1 to SP4 of the slicing machine, is additionally drawn compared with FIGS. 1*a-c* and shown individually in perspective in FIG. 4*b*.

The function bar 23 of the suction spray unit 22+33 running in transverse direction 11 has several spray openings 24 distributed in transverse direction 11, usually assigned to one of the tracks SP1 to SP4 each, i.e., at least one or also several suction openings 33.1, preferably then again assigned to one track SP1 to SP4 each, arranged in one of the outer surfaces of the function bar 23 running in transverse direction 11.

As best illustrated by FIG. 4*b*, the hollow function bar 23 is beam-shaped with, in this case, four circumferentially contiguous peripheral walls extending in its greatest direction of extension, the longitudinal direction 23', enclosing a rectangular cross section, the end faces of the function bar 23 also being tightly closed.

It should be noted, however, that this function bar 23 may also have only one or more suction openings 33.1 and no spray openings, and then be only a suction unit 33, while the spray openings are arranged elsewhere.

In FIG. 4*a*, the function bar 23 is in such a pivoted position about the transverse direction 11, which is at the same time the longitudinal extension 23' of the function bar 23, that the nozzle units 25 mounted in the narrow side of the function bar 23 extending in the transverse direction 11 on the right in FIG. 4*a* point with the spray direction 24' of their spray nozzles 24 approximately horizontally back-wards against the passage direction 10* and against the end face of the caliber K or the spray nozzles K1 projecting from the cutting frame 5 or 5.1 respectively, which is sprayed with anticaking agent T before it is separated as a slice S by the blade 3.

As can be seen more clearly from the perspective view of FIG. 4*b* of the suction-spray unit 22 alone, the suction-spray unit 22 consists on the one hand of the function bar 23, in which the nozzle units 25.1-25.4 with the respective nozzle 24.1 to 24.4 as well as below it the suction opening 33.1, which in this case is only one suction opening of the suction unit 33, is arranged in its peripheral wall pointing counter to the direction of travel 10*, i.e., to the rear, and on the other hand a holding device 30 with which the function bar 23 can be secured relative to the base frame 2 of the machine 1.

The part of the narrow side in which the slot-shaped suction opening 33.1, which is continuous over all tracks, is set at an angle to its upper part, in which the nozzles 24.1-24.4 are located, and thus points more downward, which favors the suction of anticaking agent suspended in the air directly below the function bar 23.

According to FIG. 4*a*, the holding device 30 is fastened to the cross-member 2*a* of the base frame 2, which rises obliquely from the front to the rear and is present in the top view at least on the operator side facing the operator, as FIG. 1*a* shows.

The holding device 30 is thus fastened to the base frame 2 with its rear end section 30A in the passage direction 10* and carries on its other end section 30B, which is located further forward and further up in the assembled state, the function bar 23, which is cantilevered on one side, namely with its end section 23A, fastened to the end section 30B of the holding device 30 and extends from there with its longitudinal direction 23' in the transverse direction 11, preferably over all tracks SP1 to SP4 of the slicing machine 1.

In one of the two wider, here the upwardly directed, peripheral walls 23*b* of the rectangular periphery, there is a large-area opening extending substantially almost over the entire length, which opening can be tightly closed, as can be seen in FIG. 4*b*, by a bar cover 34 which can be fitted and screwed on tightly.

In the adjacent, narrower peripheral wall 23*a*, which in the assembled state is directed against the direction of flow 10*, the spray nozzles 24.1 to 24.4 of the nozzle units 25.1-25.4 are mounted in corresponding passages, which are connected via lines in the interior of the function bar 23 to one of the storage contain-ers 26, 27, 28 for the supplied anticaking agent 25, which are placed on the cover 34 with their outlet opening facing downward.

On the one hand, it is possible to switch over—in particular automatically by means of the control—for the supply of anticaking agent to the spray nozzles 24.1 to 24.4 from a reservoir 26 which has run empty, for example, to a full reservoir 27 if the latter contains the same anticaking agent.

If, for example, three different work orders are typically carried out alternately on the machine, each requiring a different anticaking agent, one of these anticaking agents can be kept in each of the three reservoirs 26, 27, 28, and the supply of anticaking agent can be switched to the corresponding reservoir at the start of a new work order.

Preferably, the reservoirs are not refilled—at least not in the assembled state—but merely changed at the Spray unit 22. In order to facilitate this, the cover 34 can, for example, be embodied so that it can be pivoted about its front longitudinal edge, preferably in the passage direction 10*, so that after pivoting through about 180° from the closed position, the reservoirs 26, 27, 28 can be detached from the cover 34, for example by unscrewing them, with their opening pointing upwards, without any appreciable quantities of anticaking agent escaping into the environment.

As FIG. 4*b* shows, the holding device 30 has in its rear end section 30A a clamping device 40 comprising a press plate 39 which can be pressed by means of a plurality of tensioning nuts 41 in the direction towards the rear end face of the beam-shaped holding device 30 and can thereby be non-positively fastened to one of the intervening components, such as the cross-member 2*a*.

For this purpose, the tensioning nuts 41, which in this case have corresponding hand grips, are screwed onto the free end of threaded bolts protruding from this rear end face, which pass through the press plate 39.

So that the function bar 23 held at the other, front end section 30B can be positioned very variably in terms of position and rotational position about the transverse direction 11, the holding device 30 consists of a main arm 30.1, the rear end of which can be fixed to the base frame by means of the clamping device 40, and a tilting arm 30.2, which is fastened thereto so as to be pivotable about a pivot axis running in the transverse direction 11 and to which the function bar 23 can be fixed approximately by one of its end faces, likewise pivotable about a pivot axis running in the transverse direction 11.

The ports 29.1 to 29.3 for the media required by the combined suction/spray unit 22+33, in particular electric current, electric control signals, compressed air, possibly also suction air, are located on the function bar 23 preferably easily accessible near the operator side B of the machine, in particular in the end face with which the function bar 23 is fastened to the holding unit 30.

The required suction air can be generated there, in particular in the function bar, for example by means of an ejector nozzle from the compressed air which is available there anyway and which is required for the pressurized discharge of anticaking agent from the spray openings 24.1-24.4.

In order to be able to reproduce the latter tilted position, an arc-shaped scale 35.3 is attached to the end face of the function bar 23 and a pointer 36.3 is attached to the tilting arm 30.2, which points to one of the markings on the scale 35.3.

The corresponding pivoting position between tilting arm 30.2 and function bar 23 is fixed by tightening a handwheel 37.3, with which the function bar 23 can be clamped in the set pivoting position relative to the tilting arm 30.2.

Irrespective of the presence of the tilting arm 30.2, the support device 30, in particular its main arm 30.1, can consist in the longitudinal direction 30'—the greatest direction of extension—of the beam-shaped holding device 30 of two parts which can be displaced relative to one another and thus telescoped, in this case a base part 30.1*a*, on which the clamping device 40 for fixing to the base frame 2 is located, and a support part 30.1*b*, on which either the tilting arm 30.2 or directly the function bar 23 is fixed.

The dimension of the extension is again indicated by means of a scale 35.1 and a pointer 36.1 referring to it, one of which is fixed to the base part 30.1*a* and the other to the support part 30.1*b*. The set printing position is again fixed by means of a handwheel 37.1, by means of which a clamping screw is actuated which is non-rotatably connected thereto and which clamps the two parts against each other.

In the released state of this clamping device, the relative longitudinal movement from base part 30.1*a* to support part 30.1*b* can be effected by means of a threaded spindle whose drive journal 38.1 in the form of an external hexagon in this case projects from the upper end face of the main part 30.1*a*.

In addition, an adjustment of the holding device 30, in this case of the main arm 30.1, in particular of its base part 30.1*a* relative to the clamping device 40 can be made in the transverse direction to the longitudinal direction 30' of the holding device 30 or of its main part 30.1, the adjustment direction of which is also transverse to the transverse direction 11, the longitudinal direction 23', of the function bar 23.

Also there, for indicating the transverse adjustment, a scale 35.2 as well as a pointer 36.2 directed thereon are provided, one of which is fixed to the clamping device 40 and the other to the holding device 30, in particular its main part 30.1.

REFERENCE LIST

1 slicing machine, slicer
1* control
2 Base frame
3 Blade
3 rotation axis
3'' blade plane, cutting plane
3*a* Cutting edge
4 Feed conveyor, feed belt
5 cutting frame
6*a-d* product opening
7 cutting unit
8 upper product guide, upper guide belt
8.1 contact run, lower run
8*a* cutting side deflecting roller
8*b* deflecting roller facing away from the cutting side
9 bottom product guide, lower guide belt
8.1 Contact run, upper run
9*a* cutting side deflecting roller
9*b* deflecting roller facing away from the cutting side
10 Transport direction, longitudinal direction, axial direction
10* Passage direction through machine
11 1. transverse direction (width slicer)
11+ lower tangential direction
12 2nd transverse direction (height-direction caliber)
13 gripper unit, gripper slide
14,14 *a-d* gripper
15 spacer
16 gripper claw
17 discharge conveyor unit
17*a, b, c* portioning belt, discharge conveyor
18 Gripper guide
19 Height sensor
20 Feed unit
21 End piece conveyor
22 Spray unit
23 Function bar
23A, B End section
23*a, b, c* Peripheral wall, wall
23' longitudinal direction
24.1, 24.2 Spray nozzle
24' Spray direction
25.1, 25.2 nozzle unit
26 Reservoir
27 Reservoir
28 Reservoir
29.1-29.3 port
30 Holding device
30A, B End section
30' Longitudinal direction
30.1 Main arm
30.1*a* Base part
30.1*b* Support part
30.2 Tilting arm
31' Transverse axis
32 Clamping screw
33 Suction unit
33.1-0.5 Suction opening
34 Bar cover
35.1-35.3 Scale
36.1-36.3 Pointer
37.1, 37.3 Handwheel, clamping screw
38.1 Drive journal
39 Press plate
40 Clamping device
41 Tensioning nut
K Product, product caliber
KR End piece
S Slice
S1, S2 Main surface
T Anticaking agent
P Portion

The invention claimed is:

1. A slicing machine for slicing calibers into slices and forming portions therefrom, the slicing machine comprising:

a cutting unit with a rotatable blade, a feed unit for feeding a caliber in a feeding direction to the cutting unit, a discharge conveyor unit for conveying in a transport direction and comprising at least one discharge conveyor, a spray unit with at least one spray opening for applying a liquid or powdery anticaking agent to a main surface of a slice produced from the caliber, or a slice to be produced from the caliber, and a control for controlling moving parts of the slicing machine, wherein the slicing machine comprises a suction unit with at least one suction opening for sucking off anticaking agent suspended in the air, and/or the slicing machine comprises a supply of anticaking agent for supplying the at least one spray opening, and the supply of anticaking agent comprises a plurality of switchable and independently replaceable reservoirs for anticaking agent.

2. The slicing machine according to claim 1, wherein a rotation axis of the blade is arranged above the feed unit and the blade is movable below the rotation axis primarily in a tangential direction pointing from one side to the other side of the slicing machine, and wherein the at least one suction opening is arranged on the other side of the slicing machine.

3. The slicing machine according to claim 1, wherein in a longitudinal direction through the slicing machine, the at least one suction opening is arranged primarily in a longitudinal region of a cutting plane of the blade, or in the longitudinal direction adjacent thereto.

4. The slicing machine according to claim 1, further comprising a cutting frame through which the caliber is movable by the feeding unit, wherein the at least one suction opening extends with respect to a height position at least over an entire height of the cutting frame.

5. The slicing machine according to claim 1, wherein an opening plane of the at least one suction opening extends parallel to a longitudinal center plane of the slicing machine spanned by a longitudinal direction and a vertical direction.

6. The slicing machine according to claim 1, wherein the at least one spray opening on the spray unit on the one hand and the at least one suction opening on the suction unit on the other hand are arranged in such a way that the openings of the units face one another.

7. The slicing machine according to claim 1, wherein with respect to a longitudinal center plane of the slicing machine or a longitudinal center plane of individual tracks of the slicing machine, the at least one spray opening, on the one hand, and the at least one suction opening, on the other hand, are arranged on mutually opposite sides.

8. The slicing machine according to claim 1, wherein, with respect to a movement path of the caliber virtually extended beyond a cutting plane of the blade of the cutting unit, the at least one spray opening on the one hand and the at least one suction opening on the other hand are arranged on opposite sides with respect to an underside of the movement path.

9. The slicing machine according to claim 1, wherein, with respect to a cutting plane of the blade of the cutting unit, the at least one spray opening and the at least one suction opening are arranged on a same side.

10. The slicing machine according to claim 1, wherein a spray direction of the at least one spray opening is directed downwards towards the discharge conveyor unit, and wherein the at least one spray opening and the at least one suction opening are arranged above a deposit level of the discharge conveyor unit.

11. The slicing machine according to claim 1, wherein the at least one spray opening and/or the at least one suction opening are/is arranged in a function bar extending transversely over the discharge conveyor unit.

12. The slicing machine according to claim 1, wherein the supply of anticaking agent comprises at least one pair of two reservoirs each having the same contents, and/or the supply of anticaking agent comprises at least two reservoirs with different contents.

13. A method of operating a slicing machine, including a spray unit with at least one spray opening for applying anticaking agent to a main surface of a future or already produced slice, wherein the method comprises:

during a slicing operation automatically sucking off anticaking agent suspended in the air, and/or switching over between a plurality of reservoirs with a same anticaking agent in an automatically controlled manner as required.

14. The method according to claim 13, wherein the sucking off is performed continuously during the slicing operation.

15. The method according to claim 13, wherein the reservoirs are kept under a positive pressure or are kept in connection with a transport medium under positive pressure, and when switching from one reservoir to another reservoir supplying a same spray opening or group of spray openings with anticaking agent, supply of the anticaking agent is automatically switched from an outlet opening of the one reservoir to an outlet opening of the other reservoir and the positive pressure or the transport medium is switched from the one reservoir to the other reservoir.

16. The slicing machine according to claim 1, wherein the blade is rotatable about a rotation axis, and the blade is movable below the rotation axis away from a first side of the slicing machine and toward a second side of the slicing machine, wherein the at least one discharge conveyor of the discharge conveyor unit comprises multiple discharge conveyors that are spaced apart from one another in a direction transverse to the transport direction, and wherein the at least one suction opening comprises multiple suction openings that are each arranged on a side of a respective conveyor that is closest to the second side of the slicing machine.

17. The slicing machine according to claim 3, wherein the at least one suction opening extends in the longitudinal direction over the cutting plane.

18. The slicing machine according to claim 4, wherein the at least one suction opening also extends downwards over a height of a support surface of the discharge conveyor unit.

19. The slicing machine according to claim 6, wherein the at least one suction opening is arranged at a distance from the at least one spray opening with respect to a spray direction of the at least one spray opening, and/or the spray direction is directed counter to the transport direction toward a cutting plane of the blade.

20. The method according to claim 13, wherein the slicing machine includes a discharge conveyor unit having at least one discharge conveyor for conveying slices in a transport direction, and wherein the anticaking agent suspended in the air is sucked off in a lower tangential direction transverse to the transport direction next to a respective discharge conveyor of the at least one discharge conveyor, or next to the slicing machine.

* * * * *